United States Patent
Müller

(10) Patent No.: US 11,163,368 B2
(45) Date of Patent: Nov. 2, 2021

(54) METHOD FOR RECOGNIZING AN INPUT

(71) Applicant: AUDI AG, Ingolstadt (DE)

(72) Inventor: Frank Müller, Feucht (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/423,442

(22) Filed: May 28, 2019

(65) Prior Publication Data

US 2019/0377418 A1    Dec. 12, 2019

(30) Foreign Application Priority Data

Jun. 6, 2018  (DE) .................. 10 2018 208 866.7

(51) Int. Cl.
  *G06F 3/01* (2006.01)
  *G06K 9/00* (2006.01)
  *G06K 9/03* (2006.01)

(52) U.S. Cl.
  CPC ......... *G06F 3/017* (2013.01); *G06K 9/00335* (2013.01); *G06K 9/00832* (2013.01); *G06K 9/036* (2013.01)

(58) Field of Classification Search
  CPC ............................ G06K 9/00832; G06F 3/017
  See application file for complete search history.

(56) References Cited

U.S. PATENT DOCUMENTS

| | | | |
|---|---|---|---|
| 2013/0155237 A1* | 6/2013 | Paek | G06F 1/1632 348/148 |
| 2013/0191789 A1* | 7/2013 | Calman | G06F 3/017 715/863 |
| 2013/0229508 A1 | 9/2013 | Li et al. | |
| 2015/0234467 A1* | 8/2015 | Tachibana | |
| 2015/0370333 A1 | 12/2015 | Ataee et al. | |
| 2017/0010676 A1* | 1/2017 | Putman | G06F 3/017 |

FOREIGN PATENT DOCUMENTS

| | | |
|---|---|---|
| DE | 102012024778 A1 | 11/2013 |
| DE | 102016204274 A1 | 9/2017 |
| KR | 10-2014-0140014 A | 12/2014 |
| KR | 10-2015-0070605 A | 6/2015 |

OTHER PUBLICATIONS

European Search Report dated Oct. 24, 2019, in corresponding European patent application No. 19173217.1 including partial machine-generated English language translation; 8 pages.

(Continued)

*Primary Examiner* — Kent W Chang
*Assistant Examiner* — Chayce R Bibbee
(74) *Attorney, Agent, or Firm* — Maier & Maier, PLLC

(57) ABSTRACT

Methods for recognizing an input of a person with a sensor, wherein the input is recognized by the sensor by at least one gesture of the person assigned to the input, wherein a first gesture for sensing the input is applied, said gesture being sensed by the sensor, wherein a functionality of the sensor for sensing the first gesture is checked, wherein, in the event that the functionality for recognizing the first gesture is not given, alternatively a second gesture is selected and assigned to the input, wherein a switch is made from the first gesture to the second gesture for recognizing the input by the sensor.

12 Claims, 1 Drawing Sheet

(56) References Cited

OTHER PUBLICATIONS

Examination Report dated Feb. 6, 2019 of corresponding German application No. 10 2018 208 866.7; 14 pages.
Office Action dated Sep. 11, 2020 in corresponding Korean Application No. 10-2019-0066771; 11 pages including English-language translation.
European Office Action dated Mar. 25, 2021, in connection with corresponding EP Application No. 19 173 217.1 (9 pp., including machine-generated English translation).

* cited by examiner

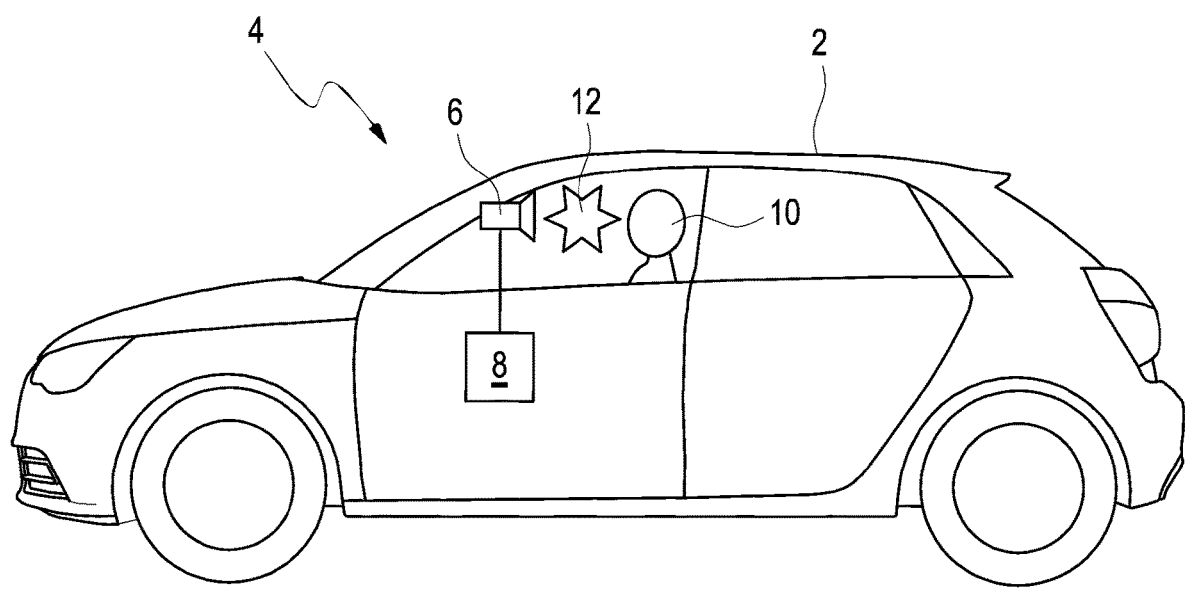

METHOD FOR RECOGNIZING AN INPUT

FIELD

The disclosure relates to a method and a system for recognizing an input of a person.

BACKGROUND

To input a command, a person can operate a switch. However, it is also possible to recognize such a command based on a gesture of the person, the gesture of the person being sensed by a sensor. However, in doing so, it should be ensured that the gesture will be sensed by the sensor reliably.

A system and a method for sensing an input gesture of a user are known from publication DE 10 2016 204 274 A1.

Against this background it was an object to reliably sense a gesture by a sensor and by doing so, to recognize an input assigned to said gesture or a command assigned to said gesture.

SUMMARY

The method according to the invention is provided for recognizing an input, for example a command, of a person by or with an optical sensor, for example. Here, the input is realized by at least one gesture of the person and thus visually displayed, wherein the at least one gesture is to be sensed by the sensor. Here, a first gesture, usually among a number of a plurality of gestures, is applied and/or defined for recognizing the input, i. e. assigned to the input or to a command associated with the input. The first gesture is stored in the sensor and/or in a memory associated with the input or with the command associated therewith and which is accessible to the sensor and can be, in trouble-free operation of the sensor, optically sensed by the sensor as a picture or an image, typically in a range to be sensed or sensible by the sensor. In the method a functionality of the sensor for sensing the first gesture is checked. If the functionality for sensing the first gesture by the sensor is not or no longer given, alternatively, a second gesture is selected for recognizing the input, which second gesture has already been assigned to the input in advance or will be assigned subsequent to a selection, wherein within the sensor, in particular automatically, a switch is made from the first gesture to the second gesture for recognizing the input by the sensor. Initially, the first gesture, and if sensing it is no longer possible without error, then the alternative second gesture which is different from the first gesture is assigned to the input to be recognized, or to a corresponding command, or to a corresponding function. It is conceivable that originally several gestures have been assigned to the input to be recognized, in particular the first and the second gesture, but initially only the first gesture for recognizing the input is switched to active mode and only if the first gesture can no longer be sensed sufficiently reliably, the second gesture is switched to active mode while the first gesture is switched to inactive mode.

Signals are generated by the sensor, a signal being assigned to each gesture, wherein a quality of the signals, in particular a quality of a first signal assigned or being assigned to the first gesture, is controlled and/or checked. By the quality of the first signal it is determined whether or not the functionality of the sensor for sensing the first gesture is given.

In addition, the second gesture is defined, wherein a second signal will be or is assigned to the second gesture.

In this case, it is possible for the second gesture to be selected from a number of predetermined gestures, wherein the second signal is assigned to the second gesture.

In the method, it is taken into account that the functionality of the sensor is dependent on environmental impacts acting on the sensor, wherein it is determined on the basis of a currently prevailing environmental impact acting on the sensor, whether or not the functionality of the sensor for sensing the first gesture is given. It is optionally possible to use an additional environmental sensor to detect the environmental impacts.

The system according to the invention is adapted to recognize an input of a person with a sensor of the system, said sensor in turn being adapted to recognize the input, e. g. a command, by sensing at least one gesture performed by the person which gesture is assigned to the input, wherein a first gesture, usually from a number of a plurality of gestures, is assigned to the input and applied. The sensor is adapted to optically sense the first gesture. The system is adapted to check a functionality of the sensor for sensing the first gesture, wherein, in the event that the functionality for sensing the first gesture is not given, the system is adapted to alternatively select a second gesture, to assign it to the input and to switch from the first gesture to the second gesture within the sensor, especially automatically, for recognizing the input by the sensor.

In an embodiment, the system has a computing unit which is connected to the sensor, wherein the sensor is adapted to generate signals and to transmit them to the computing unit. In this case, the computing unit is assigned to the sensor and possibly arranged in the same housing as the sensor.

The computing unit is adapted to control and/or check a quality of signals which are communicated from the sensor, and further to decide, based on signals generated by the sensor in response to sensing the first gesture and transmitted to the computing unit, whether or not the functionality of the sensor for sensing the first gesture is given. It is possible that in each case such a signal provides an image of the area to be sensed or to be recognized by the sensor and of a gesture realized or displayed in the area. It is furthermore possible to split or divide the area into several subareas, wherein at least two such subareas are spatially or positionally different from each other, wherein it is also possible that the at least two subareas can overlap at least partially.

In addition, it is possible that the computing unit is adapted to select the second gesture and to switch the sensor from the first gesture to the second gesture.

The system is adapted, for example, for a motor vehicle, in particular a car.

Using the sensor and/or the computing unit, an algorithm is performed, by means of which gestures are sensed and distinguished from one another. Using this algorithm, respective signals are generated in response to a respective sensing of respective gestures and furthermore, their quality is controlled.

In an embodiment, the sensor is assigned to an interior of the vehicle and adapted to sense and/or to recognize a gesture of a person in the interior.

Using the method and the system it is possible to switch between gestures sensed with an optical sensor in a vehicle, e. g. a motor vehicle or a car.

The optical sensor usually arranged in the vehicle has, for sensing and recognizing an input, e. g., a command, a certain defined or applied first gesture which is assigned to said input, in an algorithm installed in said sensor. In this case, the gesture may be a movement of a body part, for example a movement of the head, the hand or foot, for example, a step on a surface, e. g. a ground. However, due to environmental impacts, e. g. due to dirt, water, a strong sunlight, etc., it is possible that the sensor is no longer able to sense or to correctly sense the applied first gesture, which is why there is a risk that the functionality of the sensor for recognizing the input on the basis of the applied first gesture is no longer given, as the sensor no longer can correctly sense and/or observe or register the applied first gesture so that the associated input can no longer be recognized. In this case, in response to the first gesture, the sensor either no longer generates and reproduces a signal or outputs a signal disturbed with respect to the original signal assigned to the first gesture.

Within the framework of the method which can be carried out with the system, an interference of the sensor or its functionality is recognized by the sensor, for example, in a self-controlling manner, and/or by a computing unit or a controller which is possible, for example, if a permanently disturbed signal is provided by the sensor. In this case, a switch is made from the first gesture that was originally to be recognized, to the second alternative gesture. This means that in the algorithm stored in the sensor and running during operation of the sensor, the first gesture is exchanged for the second gesture, i. e. the first gesture is switched to inactive mode and the second gesture is switched to active mode. In one possible embodiment, a first gesture comprises a kick or step on a first point and/or a first marker in the area to be sensed or sensible by the sensor, wherein the first marker is arranged in front of the sensor, and has a first definable or defined distance to the sensor and is to be sensed or sensible by the sensor. Correspondingly, a second gesture comprises a kick or step on a second point and/or a second marker, wherein the second marker is arranged in front of the sensor, and has a second definable or defined distance to the sensor and is to be sensed or sensible by the sensor. In this case, it is possible to appropriately define and/or apply the second alternative gesture spatially or positionally as part of a design of the sensor and its position or positioning relative to the second marker and relative to the first marker.

In a possible embodiment, a target image of the area which target image is to be sensed by the sensor, if it is not contaminated, provided for the first gesture, can be compared with a currently sensed actual image of the area. Thus, in the case of contamination by environmental impacts, for example, also due to moisture, the sensor and/or the computing unit does not recognize a clear image or target image, in particular no clearly evaluable image, for the first gesture in the area or within the area. Furthermore, it is checked whether a target image for at least a second gesture within the area can be sensed. As a result, a switch is made only to a gesture reliably sensible in the area from a selection of a plurality of second gestures. In this case, it is possible for different gestures to be displayed or displayable in different spatial partial areas of the area which can be sensed by the sensor. In this case, one target image is provided within each subarea of the entire area for each gesture. Thus, for example, a first subarea comprises a first position at which the first gesture is to be displayed and sensed. Accordingly, a second subarea comprises a second position at which the second gesture is to be displayed and sensed.

In an embodiment the optical sensor comprises an optical element, for example a transparent window, through which light is received and sensed from outside, wherein individual subareas of the area are sensed through different portions of the optical element. In this case, the first subarea is optically sensed by the sensor through a first portion of the optically transparent element, in which the person executes the first gesture, usually a first movement associated therewith, which can be sensed by the sensor. Accordingly, through a second portion of the optically transparent element, the second subarea with the second gesture displayed therein or an associated second movement is sensed by the sensor. Thus, each gesture is assigned to a subarea and can be sensed by a respective portion. These portions differ from each other spatially, it being possible that the portions may overlap at least partially. If the sensor, in particular its transparent window, is contaminated by environmental impacts, due to such contamination, at least through a portion of the transparent element, no clear image or picture of the area to be scanned, in particular subarea, and a gesture to be realized or displayed therein can no longer be sensed by the sensor.

The contamination of the optical sensor can be measured by a measuring device or another environmental sensor for environmental impacts as a possible component of the system and is displayed for the person by a man-machine-interface (MMI) visually and/or acoustically. Additionally, a request for cleaning the optical sensor may be displayed for the person by the man-machine-interface. An automatic switching, for example, from the first gesture to the second gesture can be automatically linked to a recognition of the contamination and/or to the request for cleaning.

The method can be carried out if the first subarea for displaying the first gesture can be sensed worse by the sensor than the second subarea for displaying the second gesture.

By switching between two gestures to be recognized in the method, the functionality of the sensor for recognizing the input based on a gesture by a person and thus by a customer can also be guaranteed if the original first gesture can no longer be recognized or can not be sensed unambiguously.

In an embodiment of the method, various environmental impacts are tested after application of the regular first gesture. If a failure of the sensor is detected in particular with regard to the recognition of the first gesture, the alternative second gesture is defined taking into account the still available signals. From the original first gesture, which is originally to be recognized, subsequently or if necessary, when in the real operation of the sensor such a failure of the sensor for the correct detection of the first gesture is detected, a switch is made to the second alternative gesture.

In an alternative or additional embodiment the sensor generates images or pictures, wherein each gesture is assigned an image in the area sensed by the sensor, for example, in a subarea provided for the respective gesture, wherein a quality of the images, in particular a quality of a first image that is or will be assigned to the first gesture, for example, in the first subarea, is controlled and/or checked. Based on the quality of the first image, it is determined whether or not the functionality of the sensor for sensing the first gesture is given. In addition, the second gesture is defined, wherein a second image is assigned to the second gesture, for example, in the second subarea.

The computing unit is adapted to control and/or check a quality of images transmitted to it by the sensor, and furthermore to decide, using images which the sensor generates and transmits to the computing unit in response to sensing the first gesture, whether or not the functionality of the sensor for sensing the first gesture is given.

Using the sensor and/or the computing unit, an algorithm is performed that recognizes gestures and distinguishes them from each other. With this algorithm, respective images are also generated in response to respective sensing of respective gestures and further their quality is controlled.

In this case, in response to the first gesture, the sensor either no longer generates and reproduces an image or outputs a disturbed image relative to the original signal assigned to the first gesture.

Within the framework of the method which can be carried out with the system, an influence of the sensor is detected by the sensor or a controller, which is possible, for example, when a permanently disturbed image is provided by the sensor.

It is understood that the features mentioned above and those yet to be explained below can be used not only in the particular combination indicated, but also in other combinations or alone, without departing from the scope of the present invention.

BRIEF DESCRIPTION OF THE DRAWING

The invention is illustrated schematically in the drawing by means of embodiments and will be described schematically and in detail with reference to the drawings.

FIG. 1 shows a schematic representation of an embodiment of the system according to the invention.

DETAILED DESCRIPTION

FIG. 1 shows a schematic representation of a motor vehicle 2, in the interior of which the embodiment of the system 4 according to the invention for carrying out an embodiment of the method according to the invention is arranged. In this case, system 4 comprises an optical sensor 6 and a computing unit 8, which are connected to each other by communication technology. FIG. 1 also shows a person 10 in the interior of vehicle 2.

Sensor 6 is adapted to sense a first gesture displayed by person 10 in an area of the interior, the area being divided into different subareas, wherein the subareas differ from one another positionally or spatially. In this case, the first gesture in FIG. 1 is symbolized by a star 12 in a first area and/or at a first position within the subarea. Different types of such first gestures enable different inputs, e. g. commands, based on which corresponding functions are performed, wherein in each case a specific function is assigned a particular input which is further assigned a particular first gesture. Such a function or action, which is activated and/or triggered via the respectively assigned first gesture, is performed by at least one device of vehicle 2.

Here, a particular input or a particular function is originally assigned a first applied and/or defined gesture. In addition, each gesture is assigned at least one signal and thus also the first gesture is assigned at least a first signal which is transmitted from sensor 6 to computing unit 8, wherein computing unit 8 further causes the at least one device to carry out the function.

However, it is possible that due to environmental impacts a functionality of sensor 6 with respect to a correct sensing of the applied first gesture is affected in a subarea provided for the first gesture. Such an impairment of the functionality of sensing the first gesture is judged in the embodiment of the method based on a quality of that first signal which is assigned to the first gesture and which is to be forwarded also to computing unit 8 upon sensing the first gesture by sensor 6. It is possible for sensor 6 to generate and output a disturbed, e. g., distorted signal with respect to the first signal, when sensing the first gesture. If it now appears that the functionality for sensing the first gesture is no longer given, alternatively a second gesture is selected, applied, and/or defined. This second gesture is now assigned to the input, for example a command, and/or the function, wherein this second gesture, compared to the first gesture, is or can be sensed more readily and/or more reliably by sensor 6, since it is usually to be displayed in a different subarea and/or at a different position than the first gesture.

In an embodiment, sensor 6 generates an image of a respective gesture within the area, in particular in a subarea assigned to the respective gesture, and transmits it to the computing unit with a respective signal. On the basis of a quality of the image, it may alternatively or additionally be decided whether or not the functionality of sensor 6 for sensing the first gesture is given. For this purpose, a currently sensed image or actual image can be compared with a target image for the first gesture, wherein the functionality is given when the actual image corresponds to the target image or is at least in a tolerance range comprising the target image.

In a further embodiment, the second gesture can be assigned to the input only after determining the inoperability of the sensor with respect to the first gesture. Alternatively or additionally, the second gesture can already be assigned to the input, stored as such for retrieval, but not yet activated.

The invention claimed is:

1. A method for recognizing an input of a person comprising:
    a sensor,
    wherein the input is recognized by the sensor by at least one gesture of the person assigned to the input, wherein a first gesture for sensing the input is applied, said gesture being sensed by the sensor, wherein a functionality of the sensor for sensing the first gesture is checked, wherein it is determined on the basis of a contamination of the sensor whether or not the functionality of the sensor for sensing the first gesture is given, wherein, in the event that the functionality for recognizing the first gesture is not given, alternatively a second gesture is selected that is or will be assigned to the same input, wherein a switch is automatically made from the first gesture to the second gesture such that the same input is recognized by the sensor by the second gesture instead of by the first gesture, and wherein the second gesture is an alternative gesture that is different from the first gesture, and wherein, when the switch is made, the first gesture is switched to an inactive mode and the second gesture is switched to an active mode.

2. The method according to claim 1, wherein the sensor generates a signal upon sensing the first gesture, wherein a first signal is assigned to the first gesture, wherein a quality of the signal generated is controlled by comparison with the first signal, the quality of the signal generated being used to determine whether or not the functionality of the sensor for sensing the first gesture is given.

3. The method according to claim 2, wherein the second gesture is defined, wherein a second signal is assigned to the second gesture.

4. A system for recognizing an input of a person comprising:
    a sensor,
    wherein the system has said sensor which is adapted to recognize the input by sensing at least one gesture of the person assigned to the input, wherein a first gesture for sensing the input must be applied, wherein the sensor is adapted to sense the first gesture, wherein the system is adapted to check a functionality of the sensor for sensing the first gesture, wherein the system is adapted to determine on the basis of a contamination of the sensor whether or not the functionality of the sensor for sensing the first gesture is given, wherein, in the event that the functionality for sensing the first gesture is not given, the system is adapted to alternatively select a second gesture for recognizing the same input, assign it to the input, and automatically make a switch from the first gesture to the second gesture such that the same input is recognized by the sensor by the second gesture instead of by the first gesture, and wherein the second gesture is an alternative gesture that is different from the first gesture, and wherein, when the switch is made, the first gesture is switched to an inactive mode and the second gesture is switched to an active mode.

5. The system according to claim 4, which has a computing unit which is connected to the sensor, wherein the sensor is adapted to generate, in response to sensing a gesture, at least one signal assigned to the gesture and to transmit it to the computing unit.

6. The system according to claim 5, wherein the computing unit is adapted to control a quality of the at least one signal which is transmitted to it by the sensor and to decide based on the determined quality of the signal assigned to the first gesture, whether or not the functionality of the sensor for sensing the first gesture is given.

7. The system according to claim 5, wherein the computing unit is adapted to select the second gesture and to switch the sensor from the first gesture to the second gesture for recognizing the input.

8. The system according to claim 4, for a motor vehicle.

9. The system according to claim 6, wherein the computing unit is adapted to select the second gesture and to switch the sensor from the first gesture to the second gesture for recognizing the input.

10. The system according to claim 5, for a motor vehicle.
11. The system according to claim 6, for a motor vehicle.
12. The system according to claim 7, for a motor vehicle.

* * * * *